United States Patent
Youseff (10) Patent No.: US 9,678,778 B1
(45) Date of Patent: Jun. 13, 2017

(54) VIRTUAL CLUSTER AS A SERVICE (VCIAAS)

(71) Applicant: GOOGLE INC., Mountain View, CA (US)

(72) Inventor: Lamia Youseff, Mountain View, CA (US)

(73) Assignee: Google Inc., Mountain View, CA (US)

( * ) Notice: Subject to any disclaimer, the term of this patent is extended or adjusted under 35 U.S.C. 154(b) by 101 days.

(21) Appl. No.: 14/271,953

(22) Filed: May 7, 2014

(51) Int. Cl.
*G06F 9/455* (2006.01)
*H04L 12/911* (2013.01)

(52) U.S. Cl.
CPC ......... *G06F 9/45558* (2013.01); *H04L 47/70* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 8,074,045 B2* | 12/2011 | Devine | ............... | G06F 12/1009 711/2 |
| 8,086,822 B2* | 12/2011 | Devine | ............... | G06F 12/1009 711/202 |
| 8,261,265 B2* | 9/2012 | Chen | ..................... | G06F 9/4426 718/1 |
| 8,650,566 B2* | 2/2014 | Vaghani | ................ | G06F 3/0617 718/1 |
| 8,819,676 B2* | 8/2014 | Ports | ..................... | G06F 9/4426 718/1 |
| 9,003,408 B2* | 4/2015 | Sonnek | .................. | G06F 21/53 718/1 |
| 9,069,708 B2* | 6/2015 | Gill | ..................... | G06F 11/1446 |
| 9,178,850 B2* | 11/2015 | Lain | ....................... | H04L 45/02 |
| 9,274,974 B1* | 3/2016 | Chen | ..................... | G06F 12/109 |
| 2007/0089111 A1* | 4/2007 | Robinson | ............... | G06F 21/53 718/1 |
| 2009/0113425 A1* | 4/2009 | Ports | ..................... | G06F 9/4426 718/1 |
| 2014/0137104 A1* | 5/2014 | Nelson | ............... | G06F 9/45558 718/1 |

(Continued)

OTHER PUBLICATIONS

Govil "Virtual Clusters: Resource Mangement on Large Shared-Memorymultiprocessors", 2000, 134 pages.*

(Continued)

*Primary Examiner* — Van Nguyen
(74) *Attorney, Agent, or Firm* — Lerner, David, Littenberg, Krumholz & Mentlik, LLP (57) ABSTRACT

Provided are methods and systems for providing users with a cluster of virtual machines (VMs) on-demand, whereby a group of VMs are provisioned together. Virtual Cluster as a Service (VClaaS) relaxes many restrictions on virtualizing VMs and provides performance benefits at the same or similar encapsulations and security measures that Infrastructure as a Service (IaaS) typically provides. The VClaaS system enables users to provision an entire cluster of VMs at a time, and also allows for relaxing the isolation barrier between the machines while maintaining the encapsulation barrier for the cluster as a whole, thereby providing users with improved networking, caching, and scheduling experiences.

17 Claims, 4 Drawing Sheets

(56) References Cited

U.S. PATENT DOCUMENTS

2014/0189429 A1\* 7/2014 Gill ................... G06F 11/1446
714/19

OTHER PUBLICATIONS

Govil et al. "Cellular Disco: resource management using virtual clusters on shared-memory multiprocessors", 1999 ACM, pp. 154-169.\*
Murphy et al. "Dynamic Provisioning of Virtual Organization Clusters", 2009 IEEE, pp. 364-371.\*
Liao et al. "A Novel Mechanism for Rapid Provisioning Virtual Machines of Cloud Services", 2012 IEEE, pp. 721-735.\*
A. Gupta and L.V. Kale, "Towards Efficient Mapping, Scheduling, and Execution of HPC Applications on Platforms in Cloud", 2013 IEEE 27th International Symposium on Parallel & Distributed Processing Workshops and PhD Forum, May 20-24, 2013, IEEE Computer Society, pp. 2294-2297.
S. Niu et al., "Cost-effective Cloud HPC Resource Provisioning by Building Semi-Elastic Virtual Clusters", ACM, Denver, Colorado, Nov. 17-21, 2013.
Ren, et al., "Residency-Aware Virtual Machine Communication Optimization: Design Choices and Techniques", IEEE Sixth International Conference on Cloud Computing (2013) 8 pages.

\* cited by examiner

FIG. 1

(Prior Art)

VIRTUAL CLUSTER AS A SERVICE (VCIAAS)

BACKGROUND

Cloud computing has been advancing many areas of science and engineering by providing computational power on demand. Currently, cloud computing in IaaS (Infrastructure as a service) requires the user to provision one virtual machine at a time, where each virtual machine is encapsulated in a virtualization layer that protects the data center infrastructure from other misbehaving virtual machines and also protects the user's virtual machine from other users' misbehaving machines. This virtualization and encapsulation was designed on the assumption that the user is provisioning only one virtual machine at a time and that the virtual machine is the cloud's computational unit. This assumption was useful in making significant advancements in virtualization technologies.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

The assumption that a virtual machine is the cloud's computational unit does not necessarily hold for all workload types including, for example, science and engineering workloads, financial service workloads, and medical workloads. This realization will become even more important with new advances in analysis and visualization tools, where one virtual machine is not sufficient to provide the computational models for the cloud. In the meantime, the above assumption imposes higher performance overheads on the computational resources.

The present disclosure generally relates to methods and systems for providing online services to users. More specifically, aspects of the present disclosure relate to providing users with a cluster of VMs on-demand, and provisioning the cluster of VMs together.

One embodiment of the present disclosure relates to a computer-implemented method comprising: determining that a first virtual machine and a second virtual machine are related; provisioning the first and second virtual machines into a physical machine together as a group of virtual machines; encapsulating the group of virtual machines by providing an encapsulation barrier around the group of virtual machines; modifying an isolation barrier between the first and second virtual machines in the group; and creating shared memory between the first and second virtual machines in the group.

In another embodiment, provisioning the first and second virtual machines includes scheduling computational resources on the first and second virtual machines.

In yet another embodiment, determining that the first virtual machine and the second virtual machine are related includes determining that the first and second virtual machines are associated with the same user, and receiving an indication that the user intends to combine the first and second virtual machines into a group of virtual machines.

In still another embodiment, modifying an isolation barrier between the first and second virtual machines in the group includes relaxing a restriction on data movement between the first and second virtual machines.

In another embodiment, the method further comprises provisioning the first and second virtual machines using different settings and/or configurations based on indicated performance preferences.

Another embodiment of the present disclosure relates to a computer-implemented method comprising: provisioning a group of related virtual machines into a physical machine; encapsulating the group of virtual machines by providing an encapsulation barrier around the group of virtual machines; modifying a restriction on data movement between virtual machines belonging to the group; and creating shared memory between the virtual machines belonging to the group.

In another embodiment, provisioning the group of virtual machines includes scheduling computational resources on the virtual machines belonging to the group.

In another embodiment, the method further comprises determining that the group of virtual machines are related based on the virtual machines being associated with the same user.

In yet another embodiment, the method further comprises determining that the group of virtual machines are related based on the virtual machines being assigned to the same workload.

In still another embodiment, modifying a restriction on data movement between virtual machines belonging to the group includes relaxing the restriction on data movement between the virtual machines.

In yet another embodiment, the method further comprises provisioning a first virtual machine belonging to the group using first settings and/or configurations and a second virtual machine belonging to the group using second settings and/or configurations, wherein the first and second settings and/or configurations are different.

Yet another embodiment of the present disclosure relates to a system for provisioning a group of virtual machines, the system comprising a memory and a virtual machine monitor module configured to execute on a computer processor, and the system configured to: determine that a group of virtual machines are related; provision the group of virtual machines into a physical machine; provide an encapsulation barrier around the group of virtual machines; modify isolation barriers between virtual machines belonging to the group; and configure the memory to be shared between the virtual machines belonging to the group.

In another embodiment, the system for provisioning a group of virtual machines is further configured to schedule computational resources on the virtual machines belonging to the group.

In yet another embodiment, the system for provisioning a group of virtual machines is further configured to determine that the group of virtual machines is related based on a determination that the group of virtual machines is associated with the same user and an indication that the user intends to combine the virtual machines into a group of virtual machines.

In another embodiment, the system for provisioning a group of virtual machines is further configured to determine that the group of virtual machines is related based on a determination that the group of virtual machines are associated with the same user and a determination that the group of virtual machines are assigned to the same project.

In still another embodiment, the system for provisioning a group of virtual machines is further configured to relax a restriction on data movement between the virtual machines belonging to the group.

In yet another embodiment, the system for provisioning a group of virtual machines is further configured to provision a first virtual machine belonging to the group using first settings and/or configurations and a second virtual machine belonging to the group using second settings and/or configurations, wherein the first and second settings and/or configurations are different.

In one or more other embodiments, the methods and systems described herein may optionally include one or more of the following additional features: the determination that the first virtual machine and the second virtual machine are related is based on a determination that the first and second virtual machines are associated with the same user and a determination that the first and second virtual machines are assigned to the same project; the first and second settings and/or configurations are each based on indicated performance preferences.

Further scope of applicability of the present disclosure will become apparent from the Detailed Description given below. However, it should be understood that the Detailed Description and specific examples, while indicating preferred embodiments, are given by way of illustration only, since various changes and modifications within the spirit and scope of the disclosure will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

The headings provided herein are for convenience only and do not necessarily affect the scope or meaning of what is claimed in the present disclosure.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples and embodiments will now be described. The following description provides specific details for a thorough understanding and enabling description of these examples. One skilled in the relevant art will understand, however, that one or more embodiments described herein may be practiced without many of these details. Likewise, one skilled in the relevant art will also understand that one or more embodiments of the present disclosure can include many other obvious features not described in detail herein. Additionally, some well-known structures or functions may not be shown or described in detail below, so as to avoid unnecessarily obscuring the relevant description.

The present disclosure provides methods and systems for enabling users to schedule computational resources on a complete cluster (e.g., group) of virtual machines (sometimes referred to herein simply as "VMs" for brevity) with high-performance characteristics on-demand. As will be described in greater detail below, Virtual Cluster as a Service (VClaaS) is a high-level service for providing users with the ability to provision clusters of virtual machines that are efficiently and effectively scheduled on one or more physicals machines within the same rack.

In accordance with one or more embodiments described herein, VClaaS provides a new virtualization layer where encapsulation is placed around a cluster of virtual machines, rather than around each individual virtual machine, and isolation barriers between different VMs belonging to a cluster are modified (e.g., relaxed) so as to allow for greater data movement between the VMs. In the per-cluster encapsulation approach of the present disclosure, various virtualization properties (e.g., requirements, constraints, etc.) of the VMs belonging to a cluster are modified (e.g., changed, reduced, relaxed, etc.), as described in greater detail below.

For example, one property of virtualization that is modified in the VClaaS system of the present disclosure is isolation. While VMs may share the physical resources (e.g., hardware) of a single computer or server, the VMs remain completely isolated from each other as if they were separate physical machines. In one example, software running in one VM is isolated from other VMs as well as the underlying physical machine. This isolation property of VMs provides that bugs and other potential system risks remain contained within the VM so as not to adversely impact other VMs or parts of the physical machine or system. For example, if there are four VMs on a single physical machine (e.g., server) and one of the VMs crashes, the other three VMs will remain available. In accordance with at least one embodiment, the VClaaS system relaxes isolation barriers between different VMs, where such isolation barriers may be related to, for example, fault isolation (e.g., if a VM's operating system crashes or contains a bug, the effects of such issues are contained within the boundaries of the VM and prevented from effecting underlying hardware of the physical machine or other VMs), performance isolation (e.g., performance of the VMs is kept independent of the operations and activities being performed on the underlying hardware and other VMs such that resources consumed by one VM do not necessarily impact the performance of other VMs), and/or software isolation (e.g., different VMs run in separate software environments).

Another property of virtualization that is modified in the VClaaS system of the present disclosure is encapsulation. VMs encapsulate a complete computing environment in the sense that a VM is essentially a software container that bundles together (or "encapsulates") a complete set of virtual hardware resources, along with an operating system and all of the system's applications, inside of a software package. As will be described in greater detail below, in accordance with one or more embodiments the VClaaS system provides a virtualization layer in which multiple VMs are encapsulated as a cluster, rather than each VM being encapsulated individually.

A common use-case for a big class of science and engineering problems is to provision many VMs at the same time, and run the same computational problem concurrently across all of the VMs in parallel. A conventional model is to provision one VM as a stand-alone unit and use off-the-shelf software (e.g., clustering software) to connect the remaining VMs. However, this per-VM-encapsulation approach imposes a significant performance penalty between the VMs that are running the same parallel problem, in the form of unnecessary network overhead and memory incoherence caused by, for example, missed scheduling opportunities by provisioning the related VM on different racks and machines in the data center, missed data opportunities by not promising a shared coherent memory model and not leveraging the memory hierarchy advantage between the machines, and missed network performance improvement opportunities by not relaxing the isolation barriers between the machines.

As will be described in greater detail below, embodiments of the present disclosure relate to methods and systems for providing a cluster of VMs on-demand, where a group of VMs are provisioned together. Provisioning a group of VMs in such a manner allows for relaxing many of the existing restrictions on virtualizing VMs and provides performance benefits at the same or similar encapsulations and security measures that IaaS typically provides.

The area of virtualization came forward in order to enable different users to share the same physical machine when processing workloads, and, as described above, is built partly on the concept of isolating different virtual machines running on the same physical machine from one another. However, in the context of various high-performance computing workloads (e.g., engineering workloads), isolation of the VMs actually hurts the performance of such workloads more than it benefits them. One reason for this is the need to ensure that the different VMs are isolated for different users, which results in increased network overhead.

However, for the same user, with respect to a specific workload, the user will be utilizing several VMs and connecting between the VMs over, for example, network or shared memory operations, such that the different VMs can work together in order to achieve increased processing power (e.g., increased data processing capabilities), or additional computational power to obtain algorithmic advances for solving a particular problem (e.g., simulations, computational models, etc.). In these respects, virtualization offers tremendous advantages for individuals, researchers, scientists, and the like, where such users can rent (e.g., by the hour, by the minute, etc.) VMs on large infrastructures.

Given the observation that today's VMs are provisioned as a single VM with encapsulation around it (e.g., per-VM encapsulation) to ensure performance isolation and/or security isolation from other machines running on the same physical machine, the present disclosure provides methods and systems for expanding the encapsulation around several VMs that are working together on the same workload, solving the same problem, and provisioned by the same user.

In accordance with one or more of the embodiments described herein, by relaxing the isolation constraints between different VMs associated with the same user, and strengthening the encapsulation around several of these VMs assigned to the same workload, higher performance benefits may be realized while also meeting various performance requirements for specific workload types (e.g., engineering workloads) that are otherwise not being met by existing Cloud services. The combination of these example features, functionalities, and benefits, as well as numerous other characteristics and advantages described in greater detail below, form the basis of VClaaS.

In accordance with one or more of the embodiments described herein, encapsulation includes running (e.g., operating) a VM inside a virtual machine monitor (VMM) such that many of the sensitive operations of the machine running on the hardware can be monitored by the VMM, and thus the machine can be built for and accounted for (or the user can be built for and accounted for), while also allowing for performance between different VMs running on the same physical machine.

For example, suppose there are two VMs running on the same physical machine and both of the VMs are performing the same operation (e.g., an I/O operation or a "describes" operation). In such a scenario, adding a layer of encapsulation around the machines provides for accuracy and consistency of scheduling between the two VMs in terms of the corresponding users' access to various hardware components of the physical machine, the disk, access to writing to the disk, and the like.

As another example, suppose again that there are two VMs running on the same physical machine. Where it is determined that one of the two VMs is "malicious," encapsulation may be used to prevent the "malicious" machine from being able to attack the other VM running on the same physical machine, given that the two VMs are utilizing the same hardware, metrics, disks, etc.

In accordance with one or more embodiments described herein, the VClaaS system of the present disclosure may also include a VMM. However, the VClaaS system may include a VMM that is "skinnier" than the typical VMM found in existing per-VM encapsulation arrangements in that the VMM of the VClaaS system may have a significantly smaller and less stringent set of restrictions in terms of monitoring how the different VMs are interacting between the hardware. Such may be the case even in situations involving the same user of the different VMs. For example, it may be assumed that a user of a VM is not going to intentionally jeopardize or damage the VM in a way that could negatively impact the user's own operations. However, in the event that a user (unintentionally or accidentally) does do something to negatively impact one of their VMs, the VClaaS system of the present disclosure is designed such that the negative impact will not be felt by the VMs associated with other users. Because all of the VMs in a given cluster are associated with the same user, the VClaaS system allows a user to choose to increase performance for one VM without having to be concerned about negatively impacting the performance of other users' VMs.

In accordance with one or more embodiments, the methods and systems described herein move the virtualization enclosing barrier from a per-VM enclosure (e.g., encapsulation) to a per-cluster enclosure (e.g., encapsulation) given the relative relations between the VMs. By making use of a priori knowledge that a group of VMs belong to the same user, or a group of VMs is performing calculations on data associated with the same workload/workflow, the VClaaS system improves the overall service experience for the user with respect to at least the following example dimensions: networking, caching, and scheduling.

For example, in accordance with one or more embodiments described herein, the VClaaS system provides improvements in networking, caching, and scheduling through:

(1) relaxing the data movement restriction between the cluster of machines (VM) using, for example, advanced networking technologies available on the hardware and software stack (e.g., RDMI, zero-copy, OS-by-passing, etc.) to lower the network latency and provide higher bandwidth within the cluster of VMs;

(2) scheduling the machines (VMs) according to a provisioning theme that collocates them so as to avoid higher networking overhead of the rack and also avoid overhead associated with switching; and (3) creating (semi) shared coherent memory between the machines using any of the software (S/W) technologies known to those skilled in the art (e.g., memcached or another similar distributed memory object caching system) that will enable new workloads and prevent a variety of problems. For example, using shared memory will have a significant impact on the performance implications (e.g., latency) of sharing data between VMs. Among other advantages, using shared memory will facilitate progress of scientific computations by reducing latency that might otherwise result from not sharing memory in such a manner.

In parallelized computational workloads, various algorithms use data communication between their computational threads to work on solving large problems in a scalable fashion. For example, some algorithms will break a problem into smaller problems, and each thread will work on one of the smaller problems for a given amount of time, after which the various threads will sync-up before proceeding with additional processing. Such algorithms may perform the synchronization operation frequently. However, due to the high latency of the data communication operation, the overall performance of these algorithms is primarily determined by the synchronization operation. By introducing a shared-memory based communication between VMs with significantly lower latency, the VClaaS system of the present disclosure enables the various workloads to achieve improved performance and make faster progress on the particular problem being addressed (e.g., up to ten times (10×) faster).

Figure 1:
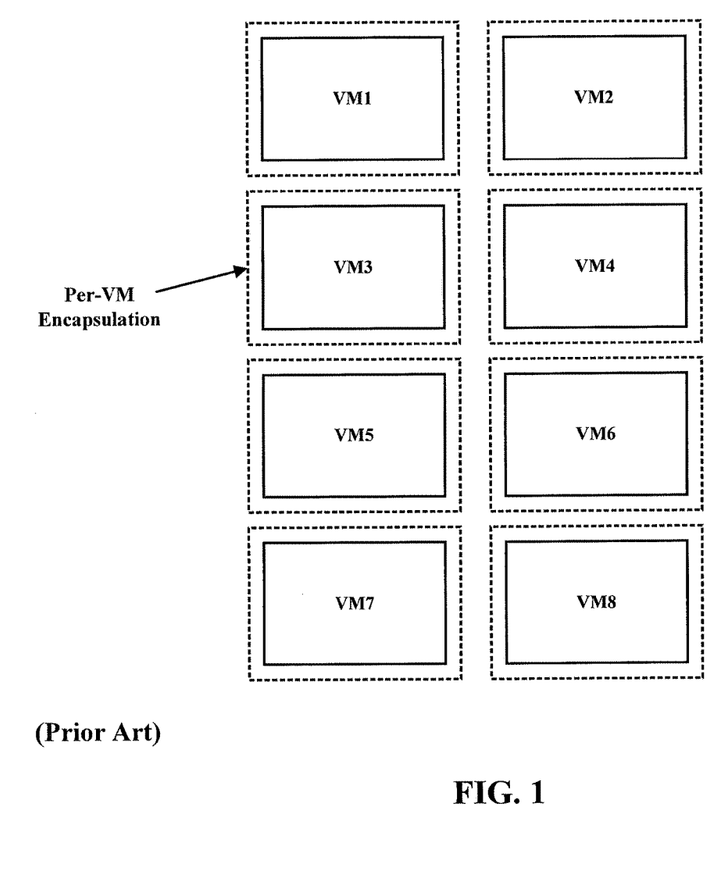
FIG. 1 is a block diagram illustrating a conventional Infrastructure as a Service (IaaS) model of provisioning one virtual machine at a time with per-VM encapsulation.

FIG. 1 illustrates a conventional IaaS model of provisioning one VM at a time with per-VM encapsulation. In such a conventional approach, each VM (VM1-VM8) is located at a different physical machine. For a network packet to flow from one VM to another VM (e.g., from VM1 to VM3) in the same cluster, the network packet is subject to unnecessary overhead, reduced bandwidth, and latency.

Figure 2:
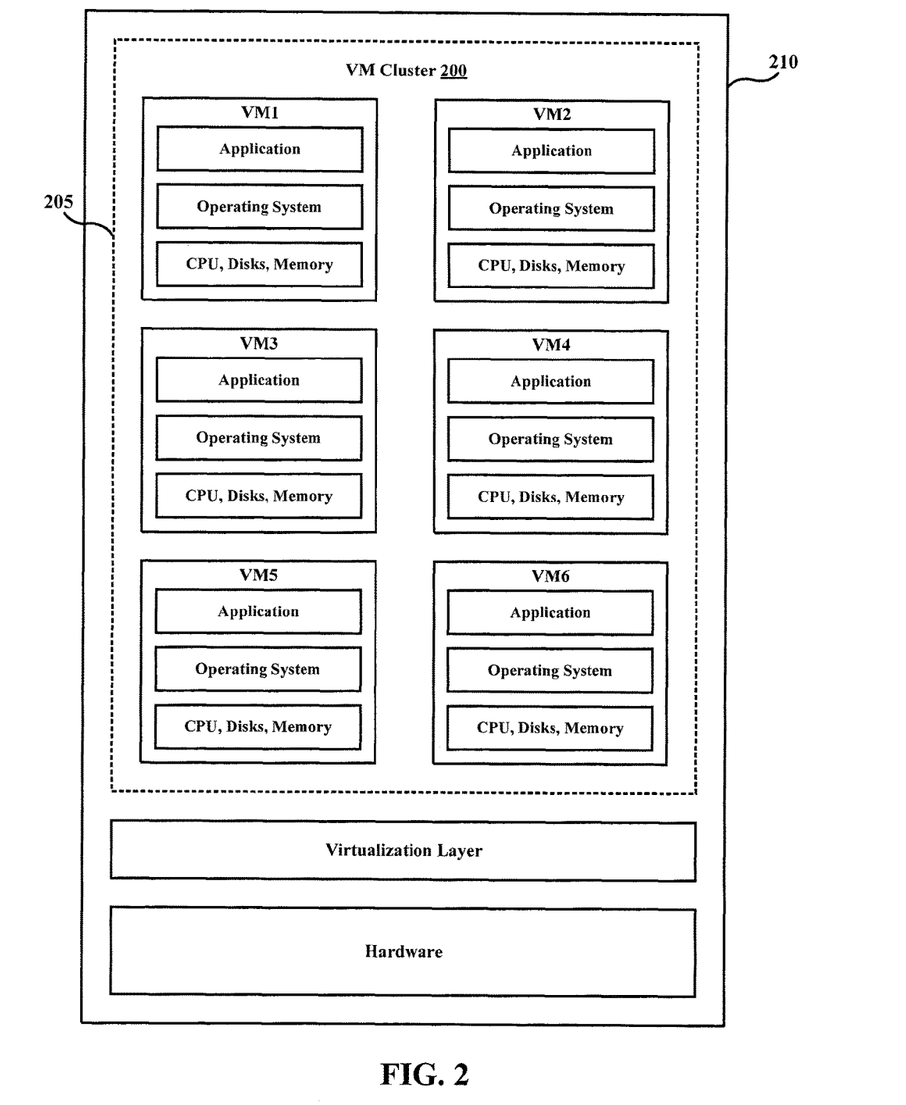
FIG. 2 is a block diagram illustrating an example architecture for a virtual cluster as a service (VClaaS) system according to one or more embodiments described herein.

FIG. 2 illustrates an example architecture for a VClaaS system in accordance with one or more embodiments of the present disclosure. The architecture allows a user to provision a cluster 200 of VMs (VM1-VM6) at one time on a single physical machine 210, and also relaxes or reduces the isolation barriers between the VMs while maintaining an encapsulation barrier 205 for the cluster 200 as a whole. Utilizing such an arrangement and architecture achieves the security benefits of virtualization (e.g., protection between the virtual machines and other machines in the data center) while also allowing the VClaaS to provide lower network overhead, lower latency, and higher bandwidth, in addition to new services in the form of semi-shared memory between the machines in the cluster 200.

As described above, in accordance with one or more embodiments, the VClaaS system may utilize shared coherent memory between VMs belonging to a given cluster (e.g., cluster 200) in order to provide users with improved networking, caching, and scheduling experiences. Because memory is one resource that often determines the number of users a provider is able to service on individual physical machines, improving memory efficiency and communication latency are key considerations of the VClaaS system.

Existing virtualization approaches and systems (e.g., the conventional IaaS model described above and illustrated in FIG. 1) often include a scheduler or provisioner (e.g., piece of software) for provisioning VMs into different physical machines over a communications network such as, for example, the Internet. In accordance with one or more embodiments described herein, the VClaaS system may include a scheduler that is modified such that in a scenario where different VMs are related or are assigned to the same workload the scheduler can determine such a relation and schedule the VMs (e.g., on physical machines) in a manner that will allow the VMs to make optimal use of network connections and memory hierarchies between the machines. As such, the VClaaS system of the present disclosure may include a scheduler configured with improved capabilities (e.g., as compared to schedulers typically found in existing per-VM encapsulation arrangements and systems) in that the scheduler can determine whether different VMs should be placed at different settings and configurations to enable, for example, higher performance.

Figure 3:
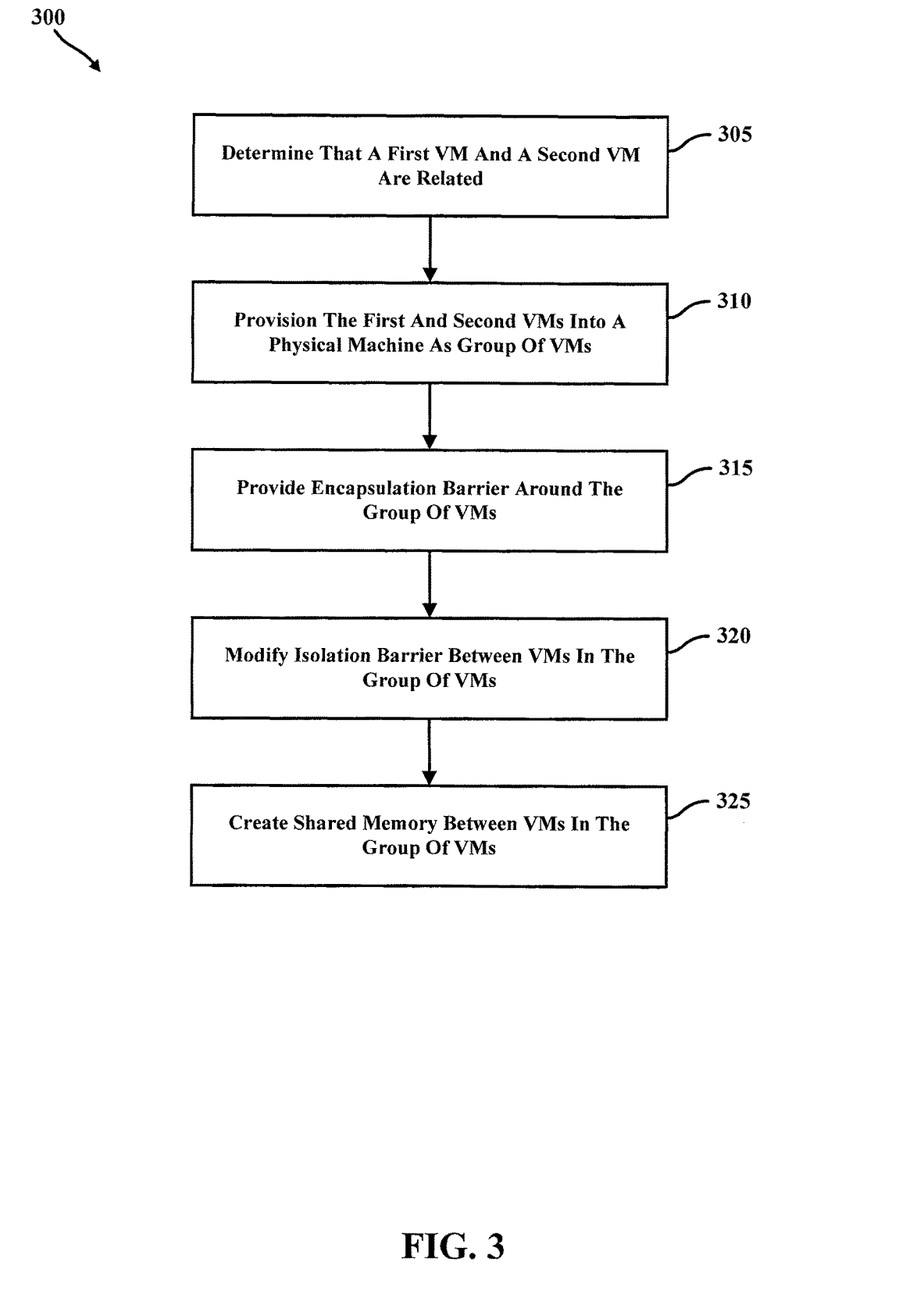
FIG. 3 is a flowchart illustrating an example method for providing users with a cluster of virtual machines on-demand and provisioning the cluster of virtual machines together according to one or more embodiments described herein.

FIG. 3 illustrates an example process 300 for providing users with a cluster (e.g., group) of VMs and provisioning the cluster of VMs together.

At block 305, a determination may be made that a first virtual machine and a second virtual machine are related. For example, virtual machines may be determined as being related if the machines are associated with (e.g., belong to, owned by, etc.) the same user, if the machines are assigned to the same workload, or based on some other indicator of a relation between machines. In accordance with at least one embodiment, the determination that multiple VMs and/or multiple clusters of VMs are related may be made based on an indication (e.g., designation) of such relation by the user, based on the user's assignment of the VMs and/or virtual clusters to the same project, or based on some other criterion/factor or combination of criteria/factors. For example, the determination that the first virtual machine and the second virtual machine are related may be based on a determination that the first and second virtual machines are associated with the same user and a determination that the first and second virtual machines are assigned to the same project. In such an instance, "project" may mean a similar task, such as, for example, and without limitation, load balancing, web surfing, or the devotion of several VMs to a single computation model. For example, the first and second virtual machines may belong to the same project where they are both dedicated to, for example, setting up a group of reduced servers, setting up a group of map servers, setting up a group of reduced servers to support a specific map-reduced pipeline, and the like.

At block 310, the first and second VMs may be provisioned into a physical machine together as a group or cluster or VMs. For example, provisioning the first and second VMs at block 310 may include scheduling (e.g., allocating) computational resources on the first and second virtual machines, such as, for example, number of CPU, amount of memory, network drivers, etc. In addition, provisioning the first and second VMs may also include installing an operating system and one or more applications on the VMs. In accordance with at least one embodiment, by creating shared memory across the VMs belonging to the group (e.g., at block 325, further described below), various computational resources may be scheduled on the first and second virtual machines in such a way that the first and second virtual machines may operate together as a single larger, more powerful and efficient virtual machine.

In accordance with one or more embodiments, provisioning the first and second virtual machines at block 310 may include provisioning the VMs using different settings and/or configurations based on performance preferences specified or indicated by the user. For example, the user may indicate a preference or desire that the group of VMs lower network overhead, reduce latency, and/or increase bandwidth, etc.

At block 315, the group of VMs may be encapsulated by providing an encapsulation barrier around the group of VMs. For example, the group of VMs may be encapsulated in a manner similar to the encapsulation 205 described above and illustrated in FIG. 2. In accordance with at least one embodiment, providing an encapsulation barrier around the group of VMs may include packaging the VMs into a single object (e.g., file) such that the group of VMs can be easily moved among host operating systems. Among other advantages, providing an encapsulation barrier around the group of VMs at block 315 allows for the state (e.g., static memory, dynamic memory, register state of the CPU and devices, etc.) of the group of VMs to be recorded and described in a straightforward manner.

At block 320, an isolation barrier between the VMs belonging to the group may be modified. For example, one or more isolation barriers may exist between the VMs belonging to the group such that events occurring at one of the VMs (e.g., removal or installation of a software application, configuration changes to the virtual operating system, a crash in the virtual computing environment, etc.) may not impact the other VMs and/or the operating environment of the host system. In accordance with at least one embodiment, at block 320 an isolation barrier between the VMs belonging to the group may be relaxed (or reduced) using any of a variety of advanced networking technologies known to those skilled in the art (e.g., RDMI, zero-copy, OS-by-passing, etc.). For example, modifying an isolation barrier between VMs belonging to the group may include relaxing a restriction on data movement between the different VMs in the group, thereby significantly lowering communication latency between them. In accordance with at least one embodiment, one or more existing isolation barriers between VMs belonging to the group may be constructed into a new isolation barrier or may be modified so that they all operate together as a group of isolation barriers.

At block 325, shared memory may be created between the VMs belonging to the group. For example, in accordance with at least one embodiment, block 325 may include creating shared memory between the VMs belonging to the group using any of a variety of distributed memory object caching technologies known to those skilled in the art (e.g., memcached). It should be understood that the shared memory may be used by some or all of the VMs belonging to the group. For example, in accordance with at least one embodiment, one or more of the VMs belonging to the group may be isolated from the pool of shared memory. In another example, the VMs belonging to the group may create shared memory across the group and draw from or give back to the pool of shared memory as necessary so that the VMs belonging to the group may operate as if they are a single unit. In accordance with at least one embodiment, creating shared memory across virtual machines belonging to the group at block 325 allows, among other things, for scheduling (e.g., allocating) computational resources on the VMs.

Figure 4:
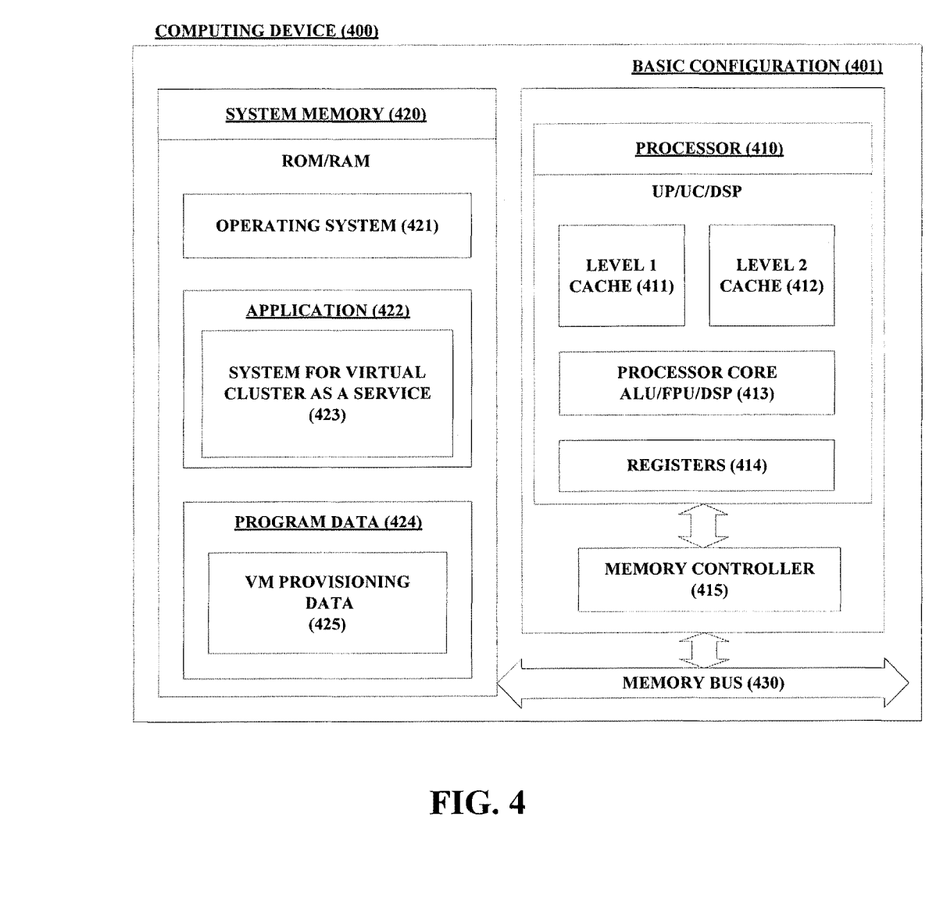
FIG. 4 is a block diagram illustrating an example computing device arranged for providing a cluster of virtual machines on-demand and provisioning the cluster of virtual machines together according to one or more embodiments described herein.

FIG. 4 is a high-level block diagram of an exemplary computer (400) that is arranged for providing a cluster of VMs on-demand and provisioning the cluster of VMs together in accordance with one or more embodiments described herein. In a very basic configuration (401), the computing device (400) typically includes one or more processors (410) and system memory (420). A memory bus (430) can be used for communicating between the processor (410) and the system memory (420).

Depending on the desired configuration, the processor (410) can be of any type including but not limited to a microprocessor (µP), a microcontroller (µC), a digital signal processor (DSP), or any combination thereof. The processor (410) can include one more levels of caching, such as a level one cache (411) and a level two cache (412), a processor core (413), and registers (414). The processor core (413) can include an arithmetic logic unit (ALU), a floating point unit (FPU), a digital signal processing core (DSP Core), or any combination thereof. A memory controller (416) can also be used with the processor (410), or in some implementations the memory controller (415) can be an internal part of the processor (410).

Depending on the desired configuration, the system memory (420) can be of any type including but not limited to volatile memory (such as RAM), non-volatile memory (such as ROM, flash memory, etc.) or any combination thereof. System memory (420) typically includes an operating system (421), one or more applications (422), and program data (424). The application (422) may include a system for providing virtual cluster as a service (VClaaS) (423), which may be configured to provide a user with a cluster of VMs on-demand and provision the cluster of VMs together. Program Data (424) may include storing instructions that, when executed by the one or more processing devices, implement a system (423) and method for providing a cluster of VMs on-demand and provisioning the cluster of VMs together. Additionally, in accordance with at least one embodiment, program data (424) may include VM Provisioning Data (425), which may relate to provisioning a cluster of VMs together. In some embodiments, the application (422) can be arranged to operate with program data (424) on an operating system (421).

The computing device (400) can have additional features or functionality, and additional interfaces to facilitate communications between the basic configuration (401) and any required devices and interfaces.

System memory (420) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media can be part of the device (400).

The computing device (400) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that include any of the above functions. The computing device (400) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location).

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
   determining, by one or more processors, that a first virtual machine and a second virtual machine are related;
   provisioning, by the one or more processors, the first and second virtual machines into a single physical machine together as a group of virtual machines;
   encapsulating, by the one or more processors, the group of virtual machines by providing an encapsulation barrier around the group of virtual machines within the single physical machine;
   modifying, by the one or more processors, an isolation barrier between the first and second virtual machines in the group by relaxing a restriction on data movement between the first and second virtual machines; and
   creating, by the one or more processors, shared memory between the first and second virtual machines in the group, wherein the encapsulation barrier around the group of virtual machines within the single physical machine controls access of the group of virtual machines to the shared memory.

2. The computer-implemented method of claim 1, wherein provisioning the first and second virtual machines includes scheduling computational resources on the first and second virtual machines.

3. The computer-implemented method of claim 1, wherein determining that the first virtual machine and the second virtual machine are related includes:
   determining that the first and second virtual machines are associated with the same user;
   and receiving an indication that the user intends to combine the first and second virtual machines into a group of virtual machines.

4. The computer-implemented method of claim 3, wherein the determination that the first virtual machine and the second virtual machine are related is based on a determination that the first and second virtual machines are associated with the same user and a determination that the first and second virtual machines are assigned to the same project.

5. The computer-implemented method of claim 1, further comprising provisioning the first and second virtual machines using different settings and/or configurations based on indicated performance preferences.

6. A computer-implemented method comprising:
   provisioning, by one or more processors, a group of related virtual machines into a single physical machine;
   encapsulating, by the one or more processors, the group of virtual machines by providing an encapsulation barrier around the group of virtual machines within the single physical machine;
   modifying, by the one or more processors, a restriction on data movement between virtual machines belonging to the group by relaxing a restriction on data movement between the first and second virtual machines; and
   creating, by the one or more processors, shared memory between the virtual machines belonging to the group, wherein the encapsulation barrier around the group of virtual machines within the single physical machine controls access of the group of virtual machines to the shared memory.

7. The computer-implemented method of claim 6, wherein provisioning the group of virtual machines includes scheduling computational resources on the virtual machines belonging to the group.

8. The computer-implemented method of claim 6, further comprising determining that the virtual machines belonging to the group are related based on the virtual machines being associated with the same user.

9. The computer-implemented method of claim 6, further comprising determining that the virtual machines belonging to the group are related based on the virtual machines being assigned to the same workload.

10. The computer-implemented method of claim 6, further comprising provisioning a first virtual machine belonging to the group using first settings and/or configurations and a second virtual machine belonging to the group using second settings and/or configurations, wherein the first and second settings and/or configurations are different.

11. The computer-implemented method of claim 10, wherein the first and second settings and/or configurations are each based on indicated performance preferences.

12. A system for provisioning a group of virtual machines, the system comprising:
one or more computing devices;
a memory storing instructions, which when executed by the one or more computing devices, cause the one or more computing devices to:
determine that a group of virtual machines are related;
provision the group of virtual machines into a physical machine;
provide an encapsulation barrier around the group of virtual machines;
modify isolation barriers between virtual machines belonging to the group by relaxing a restriction on data movement between the virtual machines belonging to the group;
configure the memory to be shared between the virtual machines belonging to the group; and
control access of the group of virtual machines to the shared memory.

13. The system of claim 12, further configured to:
schedule computational resources on the virtual machines belonging to the group.

14. The system of claim 12, further configured to:
determine that the virtual machines belonging to the group are related based on a determination that the group of virtual machines is associated with the same user and an indication that the user intends to combine the virtual machines into a group of virtual machines.

15. The system of claim 12, further configured to:
determine that the virtual machines belonging to the group are related based on a determination that the group of virtual machines is associated with the same user and a determination that the group of virtual machines is assigned to the same project.

16. The system of claim 12, further configured to:
provision a first virtual machine belonging to the group using first settings and/or configurations and a second virtual machine belonging to the group using second settings and/or configurations, wherein the first and second settings and/or configurations are different.

17. The system of claim 16, wherein the first and second settings and/or configurations are each based on indicated performance preferences.

\* \* \* \* \*